United States Patent
Jung et al.

(10) Patent No.: US 7,890,550 B2
(45) Date of Patent: Feb. 15, 2011

(54) FLASH MEMORY SYSTEM AND GARBAGE COLLECTION METHOD THEREOF

(75) Inventors: Myung-Jin Jung, Suwon-si (KR); Jang-Hwan Kim, Suwon-si (KR); Dong-Hyun Song, Yongin-si (KR); Shea-Yun Lee, Seoul (KR); Yeon-Jin Mo, Seoul (KR); Jae-Hyun Hwang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 290 days.

(21) Appl. No.: 11/646,501

(22) Filed: Dec. 28, 2006

(65) Prior Publication Data

US 2008/0109590 A1   May 8, 2008

(30) Foreign Application Priority Data

Nov. 3, 2006   (KR) .................. 10-2006-0108520

(51) Int. Cl.
  G06F 12/00  (2006.01)
  G06F 17/30  (2006.01)
(52) U.S. Cl. ..................... 707/813; 707/819
(58) Field of Classification Search ........... 707/206, 707/999.206, 813; 711/100, 154
  See application file for complete search history.

(56) References Cited

U.S. PATENT DOCUMENTS

| | | | |
|---|---|---|---|
| 4,775,932 A * | 10/1988 | Oxley et al. ................... | 1/1 |
| 5,404,485 A | 4/1995 | Ban | |
| 5,485,613 A * | 1/1996 | Engelstad et al. .............. | 1/1 |
| 5,937,425 A | 8/1999 | Ban | |
| 6,381,176 B1 | 4/2002 | Kim et al. | |
| 6,732,221 B2 * | 5/2004 | Ban ........................... | 711/103 |
| 7,315,917 B2 * | 1/2008 | Bennett et al. ............... | 711/103 |
| 2003/0229753 A1 * | 12/2003 | Hwang ........................ | 711/103 |
| 2006/0161724 A1 * | 7/2006 | Bennett et al. ............... | 711/103 |
| 2007/0294490 A1 * | 12/2007 | Freitas et al. ................ | 711/154 |

FOREIGN PATENT DOCUMENTS

| | | |
|---|---|---|
| JP | 09-097218 A | 4/1997 |
| JP | 2002-032256 A | 1/2002 |
| JP | 2004-296014 A | 10/2004 |
| JP | 2004-326523 | 11/2004 |
| JP | 2005-115561 | 4/2005 |
| JP | 2005-174468 | 6/2005 |
| JP | 2006-268880 A | 10/2006 |

* cited by examiner

*Primary Examiner*—Mohammad Ali
*Assistant Examiner*—Alexey Shmatov
(74) *Attorney, Agent, or Firm*—Harness, Dickey & Pierce, P.L.C.

(57) ABSTRACT

Example embodiments provide a garbage collection method which includes applying a weight to each of at least two or more factors to calculate garbage collection costs. A hash table is configured using the calculated garbage collection costs. The method further includes searching a block having the lowest garbage collection cost from the hash table and performing garbage collection on the searched block.

23 Claims, 5 Drawing Sheets ional patent application claims priority under 35 U.S.C §119 of Korean Patent Application 2006-108520 filed on Nov. 3, 2006, the entire contents of which are hereby incorporated by reference.

FLASH MEMORY SYSTEM AND GARBAGE COLLECTION METHOD THEREOF

PRIORITY STATEMENT

This U.S. non-provisional patent application claims priority under 35 U.S.C §119 of Korean Patent Application 2006-108520 filed on Nov. 3, 2006, the entire contents of which are hereby incorporated by reference.

BACKGROUND

Example embodiments relate to a storage device, for example, to a device and a method for managing a non-volatile and electrically erasable semiconductor memory device, for example, a flash memory.

Non-volatile memory devices may retain data stored in cells without a supply of drive power. Among non-volatile memory devices, a flash memory is widely used in various applications, for example, computers, memory cards, and the like because they have a function in which cells are electrically erased simultaneously. With increased usage of portable information devices, for example, cellular phones, PDAs, digital cameras, and the like, flash memory is widely used as a storage device, instead of a hard disk.

Flash memory may be divided into a NOR type and a NAND type based on a connection structure of cells and bit lines. Because a read speed is faster and a write operation is slower, a NOR-type flash memory may be used as a code memory. Because a write speed is faster and a price per unit area is lower, a NAND-type flash memory may be used as a mass storage device. In order to write data in a flash memory, an erase operation is performed first, and the flash memory may have such a characteristic that an erase unit is more than a write unit. This characteristic may make it more difficult to use a flash memory as a main memory. In the event that a flash memory is used as an auxiliary storage device, such a characteristic may interfere with a file system for hard disk. Accordingly, a flash translation layer (hereinafter, referred to as "FTL") may be used between a file system and a flash memory in order to hide an erase operation of a flash memory.

Functions of the FTL may include logical address-physical address mapping information management, data preservation management due to unexpected power interruption, wear-out management, and the like. Example mapping functions are disclosed in U.S. Pat. No. 5,404,485 entitled "FLASH FILE SYSTEM", U.S. Pat. No. 5,937,425 entitled "FLASH FILE SYSTEM OPTIMIZED FOR PAGE MODE FLASH TECHNOLOGIES", AND U.S. Pat. No. 6,381,176 entitled "METHOD OF DRIVING REMAPPING IN FLASH MEMORY AND FLASH MEMORY ARCHITECTURE SUITABLE THEREFOR", the entire contents of which are hereby incorporated by reference.

In the event that a flash memory is accessed by block unit, the flash memory is divided into a plurality of memory blocks. Numbers successively assigned to memory blocks are referred to as a physical block number, and virtual numbers of the divided blocks known to a user are referred to as logical block numbers. Techniques for providing mapping between logical block numbers and physical block numbers may include a block mapping technique, a sector mapping technique, and log mapping techniques. With mapping techniques of the FTL, data of logically successive addresses may be stored at physically different places.

In a case where a host issues a write command with respect to a logical block number where data was written previously, FTL may use a technique of writing data from the host at another place and invalidating previously written data. Due to this FTL characteristic, a block may be created which is filled with invalid data. Hereinafter, such a block is referred to as a "garbage block". A garbage block may be erased for conversion into a writable state and may be reused, which is called "garbage collection" or "reclaiming". Performance of a flash memory may be dependent upon how fast such an operation is performed. For example, in the event that the amount of stored data is increased due to a long usage time of a system and the number of usable reserved blocks is decreased, the performance of the garbage collection may become more important.

Together with the performance of a flash memory, its reliability is also relevant. A flash memory may be programmed and erased repeatedly, and a program-erase cycle of each block may be limited to a given number. For example, an erase operation may be performed ten thousand times until a block is considered to be unusable. If a block is worn out, performance lowering or use loss may arise at a partial region of a flash memory. A user of a flash memory system may suffer from a bad influence due to data loss or impossibility of data storage ability.

Wearing of a block (or a physical place) in a flash memory system is mainly determined by an erase cycle, and a flash memory may be worn out after about $10^5$ erases.

SUMMARY

Example embodiments provide a technique for more uniformly distributing a life cycle of a memory block (or a physical place) into an entire region of a flash memory in order to elongate a life of a flash memory.

In example embodiments, a garbage collection method is provided. The method includes applying a weight to each of at least two factors to calculate garbage collection costs. Furthermore, a hash table is configured using the calculated garbage collection costs. The method further includes searching a block having the lowest garbage collection cost from the hash table and performing garbage collection on the searched block.

In example embodiments, a memory system is provided which comprises a host, a flash memory, and an interface device configured to operate responsive to a write request of the flash memory from the host. Upon the write request, the interface device is configured to apply a weight to each of at least two or more factors to calculate garbage collection costs and to configure a hash table using the calculated garbage collection cost. The interface device is configured to search a block having the lowest garbage collection cost from the hash table and perform garbage collection on the searched block.

DETAILED DESCRIPTION OF EXAMPLE EMBODIMENTS

Figure 1:
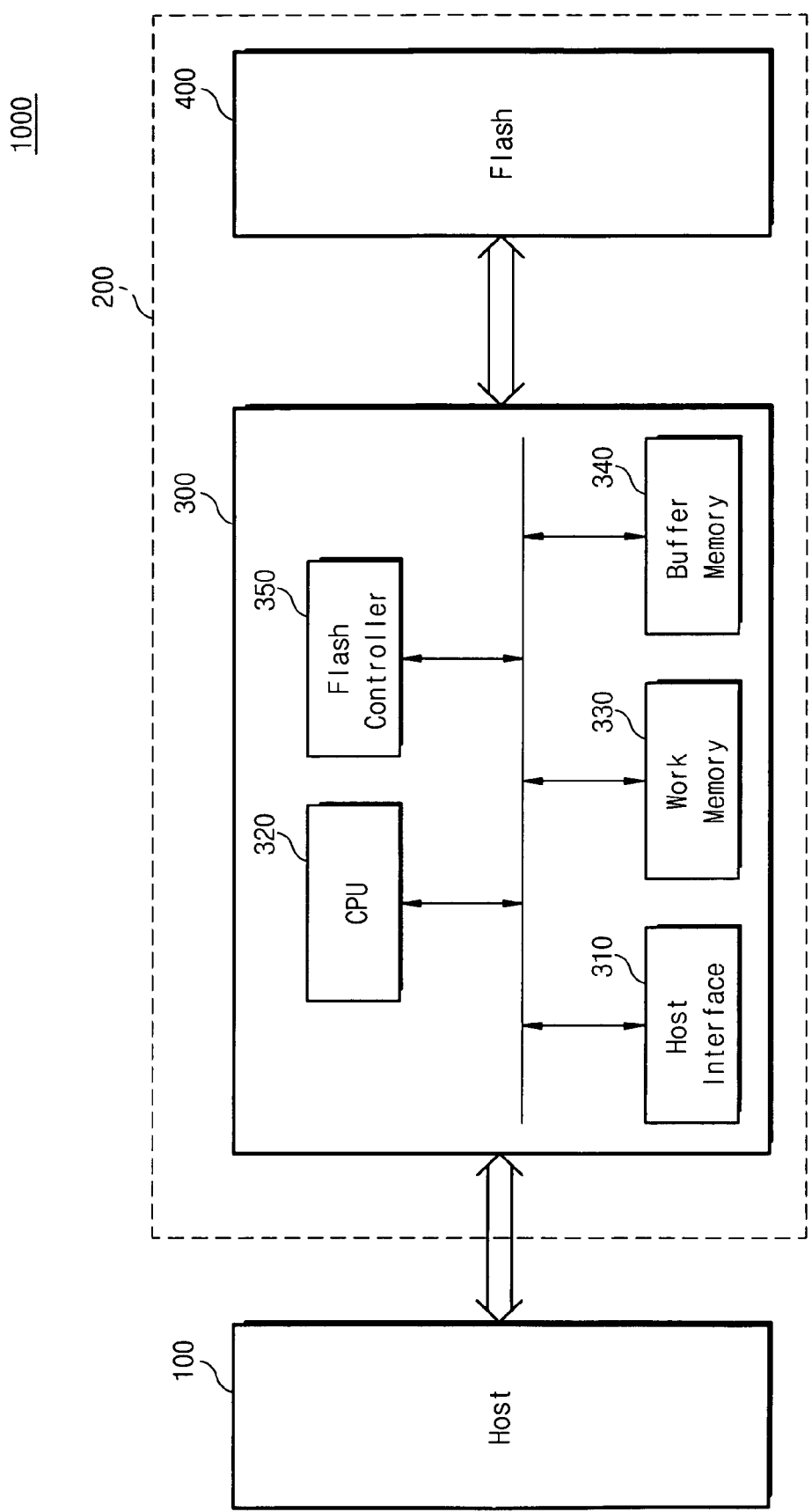
FIG. 1 is a block diagram showing a flash memory system according to example embodiments.

Example embodiments of the present invention will be more clearly understood from the detailed description taken in conjunction with the accompanying drawings.

Various example embodiments of the present invention will now be described more fully with reference to the accompanying drawings in which some example embodiments of the invention are shown. In the drawings, the thicknesses of layers and regions may be exaggerated for clarity.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the FIGS. For example, two FIGS. shown in succession may in fact be executed substantially concurrently or may sometimes be executed in the reverse order, depending upon the functionality/acts involved.

Also, the use of the words "compound," "compounds," or "compound(s)," refer to either a single compound or to a plurality of compounds. These words are used to denote one or more compounds but may also just indicate a single compound.

Now, in order to more specifically describe example embodiments of the present invention, various embodiments of the present invention will be described in detail with reference to the attached drawings. However, the present invention is not limited to the example embodiments, but may be embodied in various forms. In the figures, if a layer is formed on another layer or a substrate, it means that the layer is directly formed on another layer or a substrate, or that a third layer is interposed therebetween. In the following description, the same reference numerals denote the same elements.

Although the example embodiments of the present invention have been disclosed for illustrative purposes, those skilled in the art will appreciate that various modifications, additions and substitutions are possible, without departing from the scope and spirit of the invention as disclosed in the accompanying claims.

The present invention will now be described more fully hereinafter with reference to the accompanying drawings, in which example embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

FIG. 1 is a block diagram showing a flash memory system according to example embodiments.

Referring to FIG. 1, a flash memory system 1000 according to example embodiments may include a host 100 and an external storage device 200. The external storage device 200 may be constituted by an interface device 300 and a flash memory 400. The interface device 300 may be structured to control the flash memory 400 when an access to the flash memory 400 is requested from the host 100. The interface device 300 may manage mapping information of the flash memory 400 so as to be used as a medium where read, write and erase operations are more freely carried out like SRAM/HDD.

The interface device 300 may include a host interface 310, a central processing unit (CPU) 320, a work memory 330, a buffer memory 340, and/or a flash controller 350. The interface 310 may be configured to interface with the host 200, and the CPU 320 may control an overall operation of the external storage device 200. The work memory 330 may be used to store software necessary for performing FTL functions and to store mapping information of the flash memory 400. Mapping information of the flash memory 400 may be stored in any region (e.g., a meta region) of the flash memory 400 and may be automatically loaded onto the work memory 330 at power-up. The software needed to perform FTL functions may be stored in any region (e.g., a boot code region) of the flash memory 400 and may be automatically loaded onto the work memory 330 at power-up.

In example embodiments, the work memory 330 may be used to store information needed to perform garbage collection in the flash memory 400, which is hereinafter referred to as a garbage collection cost. Garbage collection may be performed using a garbage collection cost stored in a hash table in the work memory 330. The garbage collection cost may be updated whenever a write operation of the flash memory 400 is performed or whenever it is ended.

As well known to those skilled in the art, a structure capable of searching using a key value is called a "hash table", and searching using a hash table is called "hashing". A record in a hash table may be accessed using as an index a hash address that is obtained by calculating a received key value with a hash function. A search using a hash table is advantageous due to its high speed. An operation of calculating a garbage collection cost and a garbage collection method using the calculated garbage collection cost will be described in detail below.

Referring to FIG. 1, the buffer memory 340 may be used to temporarily store data when storing data in the flash memory 400 or when reading data from the flash memory 400. For example, the buffer memory 340 may have a storage capacity corresponding to a page size of the flash memory 400. The work memory 320 and the buffer memory 330 may be implemented with a volatile memory, for example, SRAM. Memories 320 and 330 may also be implemented using one memory (e.g., SRAM). The flash controller 350 may be configured to control access operations (e.g., read, write, and erase operations) of the flash memory 400 under the control of the CPU 320.

The flash memory 400 may include a memory cell array including a plurality of memory blocks, each of which may further include a plurality of pages. One page may correspond to one sector or plural sectors. As set forth above, memory blocks of the memory cell array may be divided into a data region, a log region and a meta region. The memory cell array may further include a memory block for storing a boot code and/or FTL. In example embodiments, the flash memory 400 may have an array structure, but is not limited thereto. A structure of the memory cell array may be implemented in a number of ways according to mapping techniques of the FTL.

As set forth above, due to a write-before-erase characteristic of a flash memory device, a technique for revising old blocks, that is, garbage collection may be important. Also, the resources of a flash memory may be limited, and its reliability is related to whether an erase number is appropriately distributed. In example embodiments, a free block may be recovered through a less work in order to rapidly process a write command of a host. Accordingly, in example embodiments, a cost for performing garbage collection may be previously calculated, and garbage collection may be made based on the calculated cost. As a result, it is possible to manage a reuse frequency of a flash memory more uniformly and to distribute an erase distribution throughout a memory. Example embodiments may use a hashing technique using a hash table as a method for managing a calculated garbage collection cost. The hashing technique may enable a free block to be generated quickly due to the speed of searching hash tables.

Figure 2:
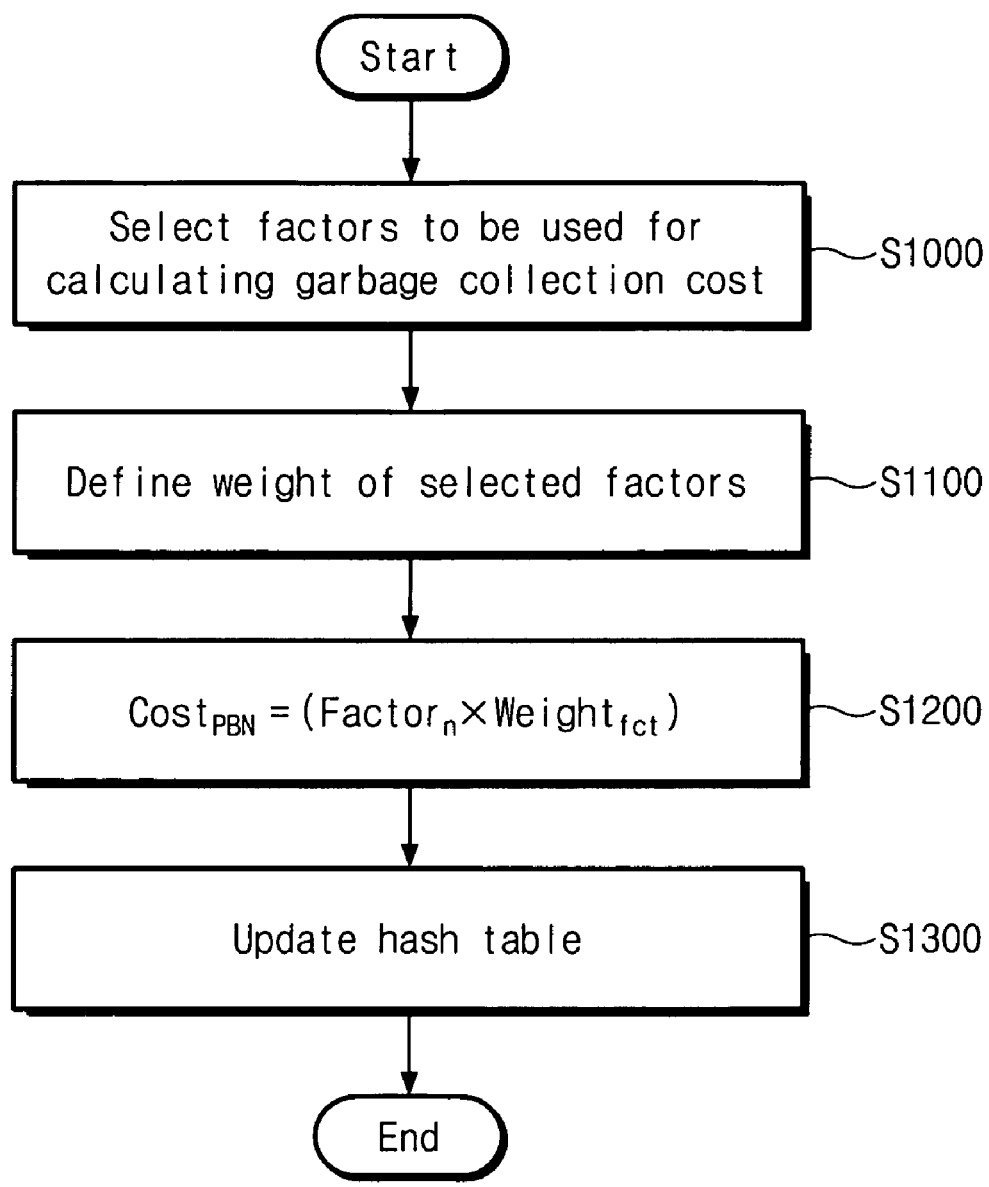
FIG. 2 is a flowchart for describing a method of calculating a garbage collection cost according to example embodiments.

FIG. 2 is a flowchart for describing a method of calculating a garbage collection cost according to example embodiments. A garbage collection cost illustrated in FIG. 2 may be calculated through FTL in response to a write command provided from a host. Alternatively, a garbage collect cost may be calculated when a write operation is made or after a write operation is performed.

Referring to FIG. 2, prior to calculation of a garbage collection cost, at S1000, factors used to calculate the garbage collection cost may be selected. At S1100, a weight may be defined with respect to each of the selected factors. Factors reflected to the garbage collection cost and weight values may be defined differently from each other according to a flash memory characteristic. For example, wear leveling information indicating a life of a flash memory and information indicating a valid page number per block may be used as factors used to calculate the cost. If the extent of importance of the wear leveling is relatively high, a weight of 0.7 may be applied to the wear leveling, and a weight of 0.3 may be applied to the valid page number per block. In example embodiments, a sum of weights applied to the factors is set to become 1.0 (e.g., 0.7+0.3=1.0).

At S1200, a garbage collection cost $Cost_{PBN}$ may be calculated with respect to each physical block number PBN using the defined factors and weights of respective factors. The cost may be calculated by the following equation.

$$Cost_{PBN} = \Sigma (Factor_n \times Weight_{fet})$$

where, $Cost_{PBN}$ indicates a garbage collection cost corresponding to a physical block number, $Factor_n$ indicates n factors, and $Weight_{fet}$ indicates a weight set to each factor. A low value of the garbage collection cost $Cost_{PBN}$ calculated by the equation means that an erase number of a corresponding block is smaller. A high value of the garbage collection cost $Cost_{PBN}$ calculated by the equation means that an erase number of a corresponding block is higher. A lower value of the garbage collection cost $Cost_{PBN}$ calculated by the equation means that a valid page number of a corresponding block is small. A higher value of the garbage collection cost $Cost_{PBN}$ calculated by the equation means that a valid page number of a corresponding block is higher. At step S1300, the calculated garbage collection costs of respective physical block numbers may be stored in a hash table. In example embodiments, garbage collection may be made using a physical block having a garbage collection cost with the lowest value stored in the hash table. As a result, the garbage collection may be made first to a block whose erase number and valid page number per block are smaller. Accordingly, the performance and/or reliability of a flash memory may be improved.

Figure 3:
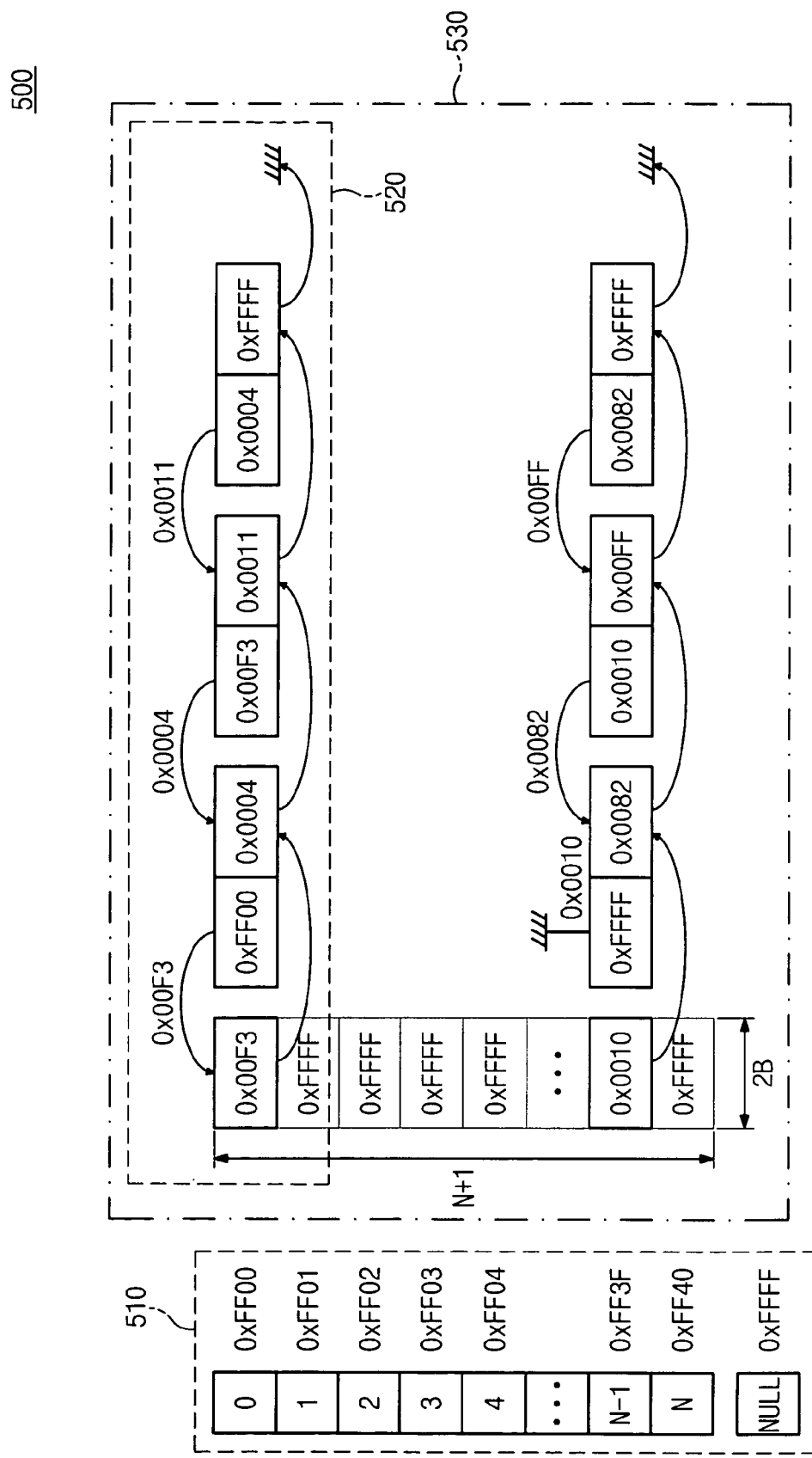
FIG. 3 is a diagram showing a hash table according to example embodiments.
Figure 4:
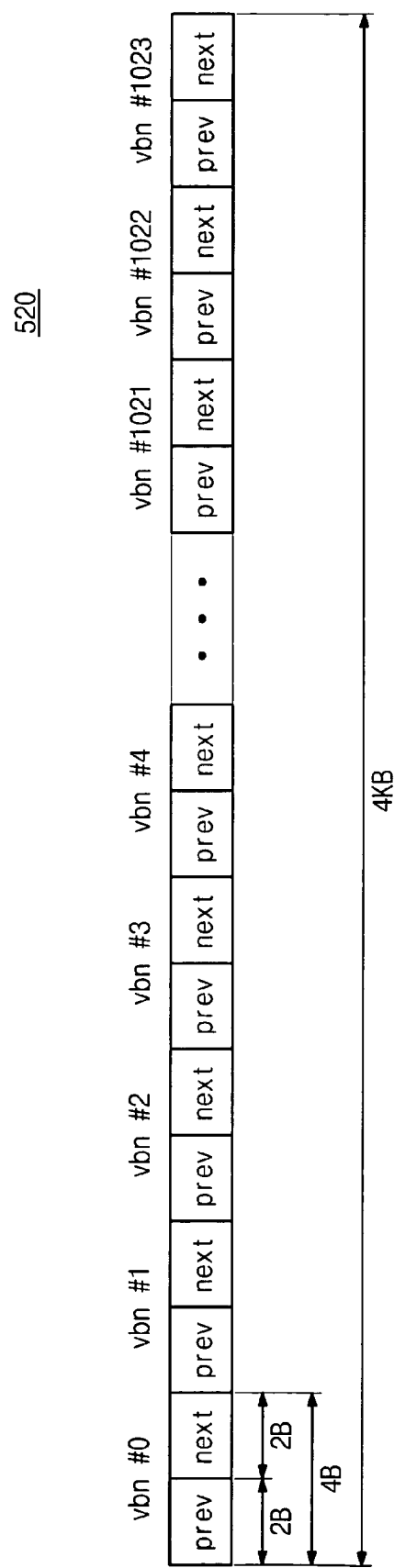
FIG. 4 is an example diagram showing a data list illustrated in FIG. 3.

FIG. 3 is a diagram showing a hash table according to example embodiments, and FIG. 4 is a diagram showing a data list illustrated in FIG. 3.

Referring to FIG. 3, a hash table 500 according to example embodiments may include a hash index 510 and a main data list 530. Garbage collection cost values calculated in FIG. 2 may be stored in the hash index 510 and have values of 0 to N. For example, if a range of the garbage collection cost value is 0 to N, an index size of the hash table becomes N+1.

The main data list 530 may include of a plurality of data lists 520 each corresponding indexes. An example configuration of the data list 520 is illustrated in FIG. 4. In example embodiments, there is expressed an example that each data list 520 is configured using a double linked list manner. As understood from FIGS. 3 and 4, each double data list 520 may include a pointer NEXT indicative of a next node, and a pointer PREV indicative of a previous node. Accordingly, it is possible to search lists forward and backward. Insertion and deletion of nodes may be made easily. In example embodiments, each point of the double data list 520 may include two bytes. A pair of pointers each indicating previous and next nodes may include four bytes. However, forms of linked lists illustrated in FIGS. 3 and 4 are not limited to the above. For example, a configuration of a linked list used in example embodiments may be implemented as a single linked list or a circular linked list.

Returning to FIG. 3, a physical block number (e.g., a physical block address) having a corresponding cost value may be stored in each index. In example embodiments, one physical block number is stored in a corresponding index. Because respective physical block numbers may be interlinked in a linked list form, although one physical block number is known, it is possible to search other physical block numbers having the same cost as the known physical block number.

For example, an index 0xFF00 corresponding to a garbage collection value "0" corresponds to a physical block number 0x00F3. A previous physical block number of the physical block number 0x00F3 is 0xFF00, and a next physical block number of the physical block number 0x00F3 is 0x0004. A next physical block number of the physical block number 0x0004 is 0x0011, and a next physical block number of the physical block number 0x0011 is 0xFFFF. In example embodiments, the physical block numbers are arranged in this order of 0xFF00, 0x00F3, 0x0004, and 0xFFFF and each have a garbage collection cost value of 0. Likewise, a physical block number 0x0010 corresponds to an index 0xFF3F corresponding to a garbage collection cost value (N−1). A previous physical block number of the physical block number 0x0010 is 0xFFFF (that is, NULL), and a next physical block number of the physical block number 0x0010 is 0x0082. A next physical block number of the physical block number 0x0082 is 0x00FF, and a next physical block number of the physical block number 0x00FF is 0xFFFF. Because indexes having garbage collection cost values 1 to 4 and an index having a garbage collection cost value N have no corresponding physical block numbers, a value of a '0xFFFF' state may be assigned. The physical block numbers may be arranged in this order of 0xFFFF, 0x0010, 0x0082, 0x00FF, and 0xFFFF and each have a garbage collection cost value of (N−1).

Figure 5:
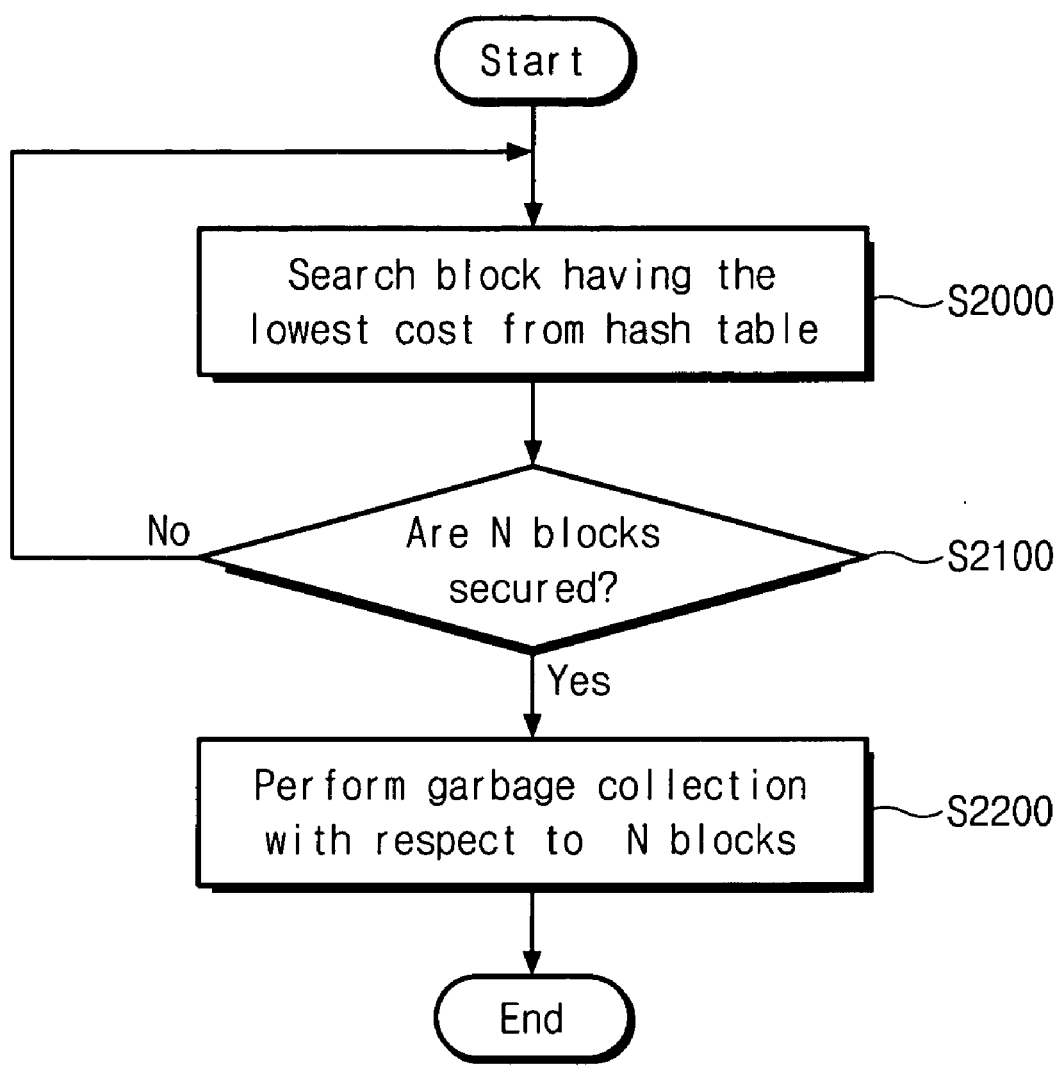
FIG. 5 is a diagram for describing a garbage collection method according to example embodiments.

FIG. 5 is a diagram for describing a garbage collection method according to example embodiments.

Referring to FIG. 5, according to a garbage collection method in example embodiments, at S2000, a block having the lowest cost is searched from a hash table 530. The searched block may be a target block to be used for garbage collection. At S2100, there is determined whether N blocks are secured as the search result. If so, the procedure goes to S2200, in which the garbage collection is made with respect to the searched N blocks. If not, the procedure goes to S2000 in which a block having the lowest cost is searched from the hash table 530. The search operation is repeated until N blocks are secured.

The number (e.g., N) of blocks to be used for garbage collection may be determined by the garbage collection algorithm of FTL, and may be changed. Further, in the event that a memory block whose cost value is M is searched to be a block having the lowest cost value at S200, blocks interlinked in a linked list form with the searched block may be searched as blocks to be used for garbage collection. If N memory blocks corresponding to a cost value M exist, the garbage collection may be made using the N memory blocks with the cost value M. On the other hand, if no N memory blocks corresponding to a cost value M exist, N memory blocks may be secured by additionally searching blocks with a cost value (M+1) (or blocks with a cost value more than (M+1)). Afterwards, the garbage collection may be made using the secured N blocks.

As described above, a data structure of a hash table 500 and a main data list 530 forming the hash table 500 may allow only one linear search within a range of garbage collection costs. During the linear search period, a search time is allowed N times to search N blocks. If the garbage collection cost is not formed of the hash table, the linear search needing a search time of N times is repeated N times until N blocks to be used for garbage collection are all searched. Therefore, according to example embodiments, where garbage collection costs are configured in a hash table form, it is possible to reduce a time taken to search N blocks to be used for garbage collection.

As understood from the above description, it is possible to improve the reliability and/or performance of a flash memory device by more uniformly distributing an erase distribution throughout a memory region and performing garbage collection at higher speed.

Although example embodiments have been described in connection with the accompanying drawings, they are not limited thereto. It will be apparent to those skilled in the art that various substitution, modifications and changes may be thereto without departing from the scope and spirit of the appended claims.

What is claimed is:

1. A garbage collection method of a memory system including an interface device, the method comprising:
   applying, by the interface device, a weight to a first factor and a second factor to calculate garbage collection costs, the weight for the first factor being higher than the weight for the second factor;
   configuring, by the interface device, a hash table using the calculated garbage collection costs;
   searching, by the interface device, a block having the lowest garbage collection cost from the hash table; and
   performing, by the interface device, garbage collection on the searched block,
   wherein the first factor is wear level information and the second factor is information of a valid page number per block or the second factor is wear level information and the first factor is information of a valid page number per block, and
   the garbage collection costs are calculated by adding at least a product of the first factor and the first weight and a product of the second factor and the second weight, with respect to each physical block.

2. The garbage collection method of claim 1, wherein a sum of weights assigned to the first factors and the second factor has a value of 1.0.

3. The garbage collection method of claim 1, wherein the hash table includes a plurality of data lists corresponding to the garbage collection costs.

4. The garbage collection method of claim 3, wherein each of the plurality of data lists is a linked list.

5. The garbage collection method of claim 3, wherein each of the plurality of data lists is one selected from a group of a single linked list, a double linked list, and a circular linked list.

6. The garbage collection method of claim 1, wherein the garbage collection costs are updated whenever a write operation of a flash memory device is carried out.

7. The garbage collection method of claim 1, wherein the garbage collection costs are updated whenever a write operation of a flash memory device is ended.

8. The garbage collection method of claim 1, wherein blocks are detected based on increasing garbage collection costs.

9. The garbage collection method of claim 8, wherein during garbage collection, the garbage collection is performed on N (where N is an integer >1) blocks.

10. A storage device comprising:
   a flash memory; and
   an interface device configured to operate responsive to a write request of the flash memory from a host, the interface device including,
      a host interface configured to interface with the host, a control processing unit configured to control an overall operation of the storage device, a work memory configured to store software for performing flash translation layer functions and to store mapping information of the flash memory, and a buffer memory configured to temporarily store data when storing data in the flash memory or when reading data form the flash memory, wherein upon the write request, the interface device is configured to apply a weight to a first factor and a second factor to calculate garbage collection costs and to configure a hash table using the calculated garbage collection cost, the weight for the first factor being higher than the weight for the second factor; and wherein the interface device is configured to search a block having the lowest garbage collection cost from the hash table and to perform garbage collection on the searched block, and the first factor is wear level information and the second factor is information of a valid page number per block or the second factor is wear level information and the first factor is information of a valid page number per block, and the garbage collection costs are calculated by adding at least a product of the first factor and the first weight and a product of the second factor and the second weight, with respect to each physical block.

11. The flash storage device of claim 10, wherein a sum of weights assigned to the first factors and the second factor has a value of 1.0.

12. The flash storage device of claim 10, wherein the hash table includes a plurality of data lists corresponding to the garbage collection costs.

13. The flash storage device of claim 12, wherein each of the plurality of data lists is a linked list.

14. The flash storage device of claim 13, wherein each of the plurality of data lists is one selected from a group of a single linked list, a double linked list, and a circular linked list.

15. The flash storage device of claim 14, wherein the garbage collection costs are updated whenever a write operation of the flash memory is carried out.

16. The flash storage device of claim 10, wherein the garbage collection costs are updated whenever a write operation of the flash memory is ended.

17. The flash storage device of claim 10, wherein the interface device is configured to detect blocks based on increasing garbage collection costs.

18. The flash storage device of claim 17, wherein the interface device performs the garbage collection on N (where N is an integer >1) blocks.

19. The flash storage device of claim 18, wherein the flash memory stores software to perform a flash translation layer function.

20. The flash storage device of claim 10, wherein software stored in the work memory is loaded from the flash memory.

21. The flash storage device of claim 20, wherein the work memory includes either one of DRAM and SRAM.

22. The flash storage device of claim 20, wherein the hash table is loaded from the flash memory to the work memory.

23. The flash storage device of claim 10, wherein the hash table is stored in the flash memory.

* * * * *